United States Patent
Kajii

(10) Patent No.: US 8,302,836 B2
(45) Date of Patent: Nov. 6, 2012

(54) BALL ARRAY MASK AND BALL ARRAY MASK SUPPORTING APPARATUS

(75) Inventor: Yoshihisa Kajii, Kanazawa (JP)

(73) Assignee: Shibuya Kogyo Co., Ltd., Kanazawa-shi, Ishikawa-ken (JP)

( * ) Notice: Subject to any disclaimer, the term of this patent is extended or adjusted under 35 U.S.C. 154(b) by 265 days.

(21) Appl. No.: 12/544,351

(22) Filed: Aug. 20, 2009

(65) Prior Publication Data

US 2010/0044412 A1    Feb. 25, 2010

(30) Foreign Application Priority Data

Aug. 21, 2008    (JP) .................. 2008-212970

(51) Int. Cl.
*B23K 1/00*    (2006.01)

(52) U.S. Cl. ........................................ 228/41; 118/504

(58) Field of Classification Search ............... 228/41; 118/504

See application file for complete search history.

(56) References Cited

U.S. PATENT DOCUMENTS
2009/0260566 A1*  10/2009  Landgraf et al. .............. 118/504

FOREIGN PATENT DOCUMENTS
JP    2007-324404    12/2007

\* cited by examiner

*Primary Examiner* — Nicholas D'Aniello
(74) *Attorney, Agent, or Firm* — Drinker Biddle & Reath LLP

(57) ABSTRACT

A ball array mask includes: a metal mask, which includes through holes into which minute balls are inserted, and which is positioned at a location above an object to be mounted; a hollow frame; a stretchable sheet, edges of the metal mask being affixed to the hollow frame by the stretchable sheet; and projection members that are attached to respective corners of the metal mask so as to pull the metal mask outwardly.

2 Claims, 4 Drawing Sheets

_(1)_

BALL ARRAY MASK AND BALL ARRAY MASK SUPPORTING APPARATUS

This application claims priority from Japanese Patent Application No. 2008-212970 filed on Aug. 21, 2008, the entire subject matter of which is incorporated herein by reference.

BACKGROUND OF THE INVENTION

1. Field of the Invention

The present invention relates to a ball array mask and a ball array mask supporting apparatus. The present invention has been developed with mainly focus on a ball array mask and a ball array mask supporting apparatus utilized for a system that arrays minute balls by relatively moving a ball cup storing the minute balls over an array mask having through holes by way of which the balls are inserted into a predetermined pattern.

2. Description of the Related Art

In a solder ball mounting apparatus that mounts solder balls on respective electrodes formed on a wafer, which is an object to be mounted, in a predetermined array pattern, the number of solder balls to be mounted by one operation is increased as a result of miniaturization of the solder balls and an increase in the size of a product which is an object to be mounted, such as a wafer. Under such a circumstance, in order to diminish occurrence of defects in the array of solder balls or defects, which would otherwise be caused during mounting, there has been provided a related art solder ball mounting apparatus that mounts a ball array mask over a wafer printed with flux, wherein a ball cup moves over the ball array mask and drops solder balls directly on electrodes of a wafer.

As for such a related art solder ball mounting apparatus, JP-A-2007-324404 discloses a technique, in which a base member is arranged so as to surround an object to be mounted, a ball array mask is brought and held into contact with and on an upper edge of the base member (a backup plate) under tensile force, thereby enhancing plane accuracy of the ball array mask. A tensile force imparting unit employed in the related art solder ball mounting apparatus is embodied by attaching holding block members to respective corners of the metal mask and stretching the holding block members outside.

However, the tensile force imparting unit pulls the corners of the metal mask. When the metal mask is square, obliquely outward tensile force is exerted on the metal mask, and sufficient tensile force, is exerted around the respective corners. However, there has also arisen a case where insufficient tensile force is imparted to center portions of respective sides of the metal mask. Since the metal mask is made of metal, such as very thin nickel, there is a risk of the metal mask being crimped in some way of holding at the time of operation for attaching and detaching the metal mask to and from the ball array mask supporting apparatus or a potential risk of a finger being cut by a sharp edge of the metal mask. Thus, the metal mask is difficult to handle.

SUMMARY OF THE INVENTION

In order to solve the problem, an object of the present invention is to enhance the plane accuracy of a metal mask. In the present invention, edges of the metal mask is affixed to a hollow frame by way of a sheet under tensile force so as to apply uniform tensile force to respective sides of the mask, each of corners of the metal mask includes a projecting member, and to pull the metal mask in externally oblique directions in such a way that the metal mask is pressed against a contact member surrounding an object to be mounted.

According to a first aspect of the invention, there is provided a ball array mask comprising: a metal mask, which comprises through holes into which minute balls are inserted, and which is positioned at a location above an object to be mounted; a hollow frame; a stretchable sheet, edges of the metal mask being affixed to the hollow frame by the stretchable sheet; and projection members that are attached to respective corners of the metal mask so as to pull the metal mask outwardly.

According to a second aspect of the invention, there is provided a ball array mask supporting apparatus that supports the ball array mask according to claim 1 at a position above the object to be mounted, the ball array mask supporting apparatus comprising: a contact member that surrounds the object to be mounted; and tensile force imparting units that pull the ball array mask in a direction which is oriented slightly downward so as to press the ball array mask against the contact member and which pull the ball array mask outwardly.

In the first aspect of the invention, edges of a metal mask are affixed to a hollow frame by way of a stretchable sheet, and projection members capable of pulling the metal mask outside are provided at respective corners of the metal mask. Therefore, uniform tensile force is imparted to the metal mask, so that the degree of plane accuracy of the ball array mask can be enhanced.

The second aspect of the invention is directed to a ball array mask supporting apparatus including tensile force imparting members that are oriented slightly, downwardly so as to press the mask against the contact member surrounding the object to be mounted and that pull the ball array mask outside. Therefore, the degree of plane accuracy of the ball array mask can be enhanced.

DETAILED DESCRIPTION OF THE PREFERRED EMBODIMENTS

Figure 1:
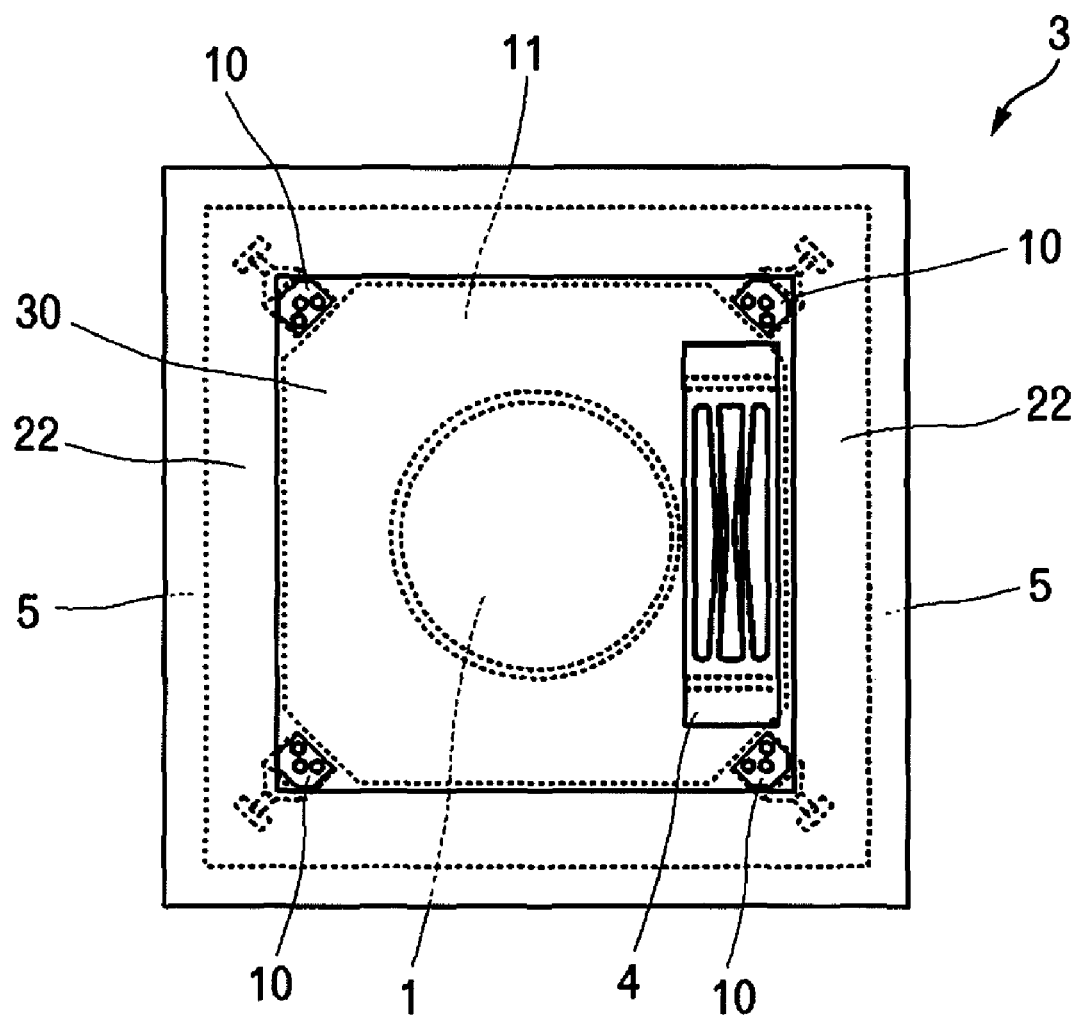
FIG. 1 is an explanatory plan view showing a ball array mask of an embodiment.

A working mode of the present invention is hereunder described along with an embodiment and by reference to the drawings. The embodiment relates to a solder ball mounting apparatus. The solder ball mounting apparatus has a wafer carrying-in delivery part, a flux print part, a ball mounting part, and a wafer carrying-out part. A ball array mask and an apparatus supporting the ball array mask pertaining to the present invention are used in the ball mounting part.

Minute balls of the present invention include solder balls, platinum balls, and the like, which correspond to conductive balls. An object on which the minute balls are to be mounted includes a semiconductor wafer (hereinafter described simply as a "wafer"), an electronic circuit board, a ceramic board, and others. Solder balls and a wafer are used in the embodiment. Flux, a solder paste, a conductive adhesive, and the like, is used as an adhesive material. In the embodiment, flux is used, and electrodes on the wafer, on which the solder balls are to be placed, are previously applied with flux.

Although details on the ball mounting part are not illustrated as a single drawing in the embodiment, a wafer placement table 9 (shown in FIG. 2) on which the wafer 1 is to be placed, a ball cup 4 for supplying solder balls 2 (shown in both FIGS. 1 and 3), a ball array mask 3 (shown in FIGS. 1 through 4) used for inserting the solder balls 2 into a predetermined array pattern, and a ball array mask supporting apparatus 100 are set.

The wafer placement table 9 has an elevation mechanism. When the solder balls 2 are arrayed, the elevation mechanism elevates the wafer 1 so as to achieve predetermined space between a solder ball mounting surface of the wafer 1 and a lower end face of the ball array mask 3 (specifically, a metal mask 30). Herein, the elevation mechanism may elevate the wafer 1 to a height at which an upper surface of the wafer 1 and the lower end face of the ball array mask 3 contact each other.

In the ball array mask 3, edges of the metal mask 30 acting a mask metal part are affixed to a hollow frame 5 by way of gauze 22 corresponding to a stretchable sheet. A holding block member 10, which is a projecting member capable of pulling outside a corresponding corner of the metal mask 30, is attached to each of the corners of the metal mask 30. Incidentally, the gauze 22 is made of woven fabric made of polyester, etc.

The metal mask 30 is made of very thin metal (whose thickness is, for example, 30 μm to 0.5 mm), such as nickel. Through holes 8 measured so as to enable insertion and passage of the solder balls 2 are formed within a center through-holed area 6 so as to have a predetermined array pattern matching electrodes on the upper surface of the wafer 1.

Figure 3:
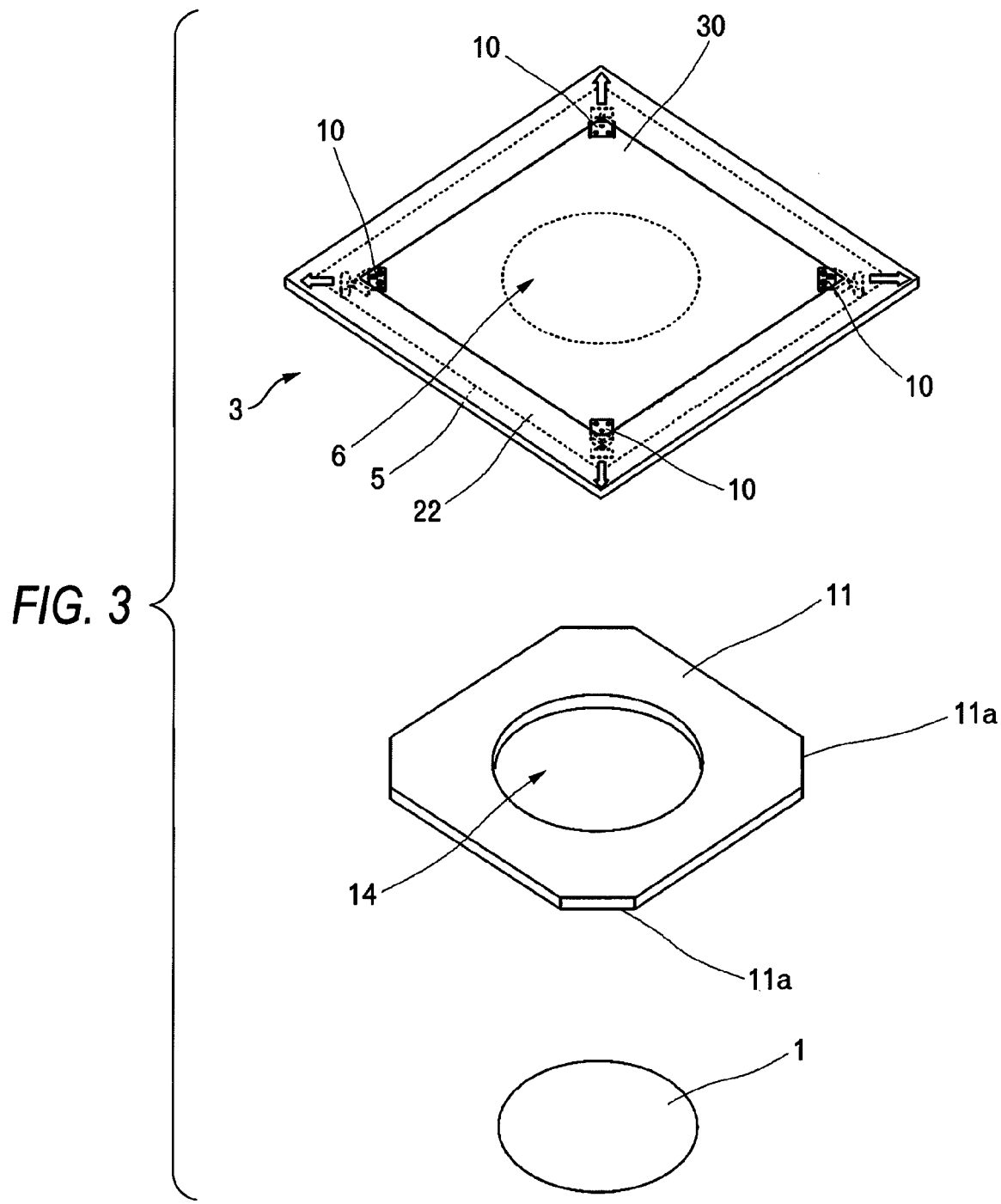
FIG. 3 is an exploded perspective view showing a relationship between a wafer, a backup plate, and a ball array mask.
Figure 4:
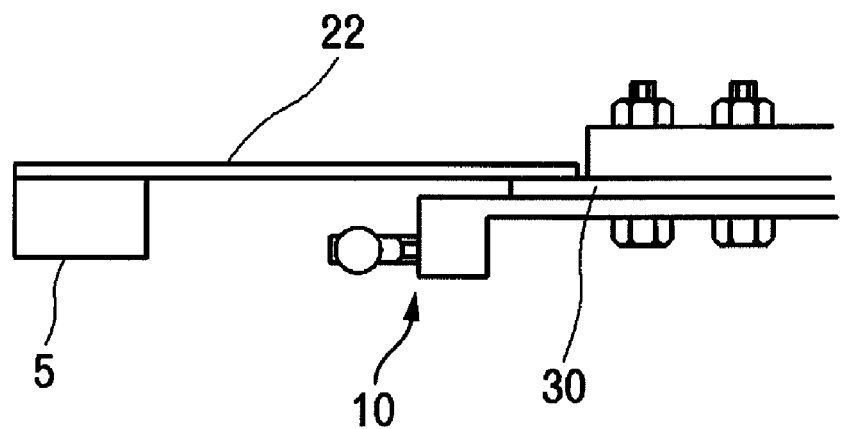
FIG. 4 is a partially-enlarged cross-sectional explanatory view of a ball array mask.
Figure 5:
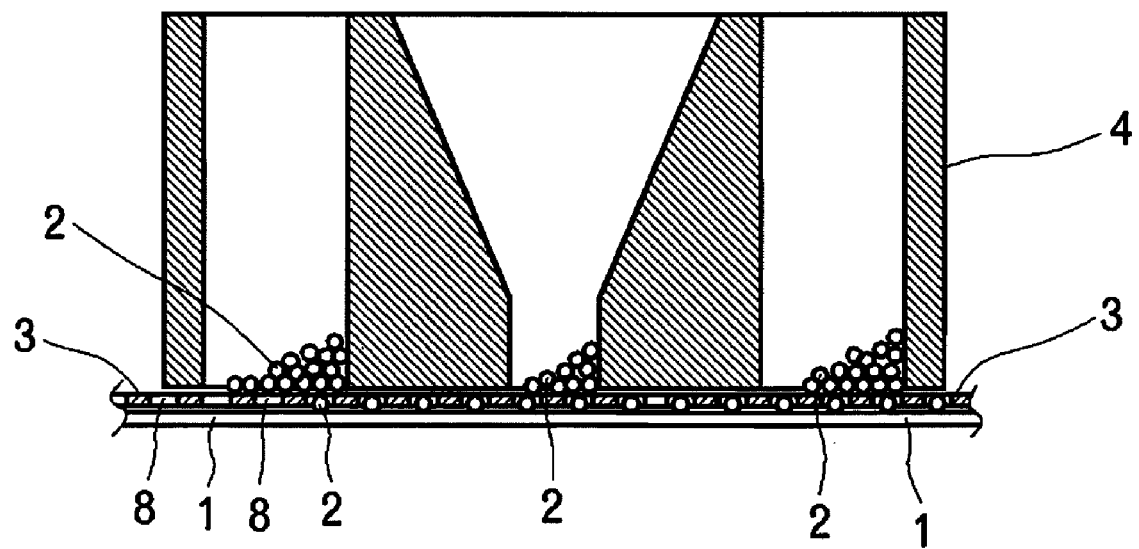
FIG. 5 is an explanatory view showing a relationship between the wafer, the ball array mask, and a ball cup.

The metal mask 30 and the frame 5 of the embodiment are formed in a substantially square shape as shown in FIGS. 1 and 3. As a matter of course, the shape does not need to be square; however, a polygonal shape is suitable for application of tensile force. The gauze 22 is attached to the edges of the square metal mask 30 and affixed to the square frame 5 under tensile force. Therefore, uniform tensile force acts on the through-holed area 6 of the metal mask 30 from directions of the four sides. The holding block member 10 is attached to each of the four corners of the metal mask 30. The diagonally-positioned holding block members 10 are arranged such that the through-holed area 6 located at the center of the metal mask 30 is sandwiched. The gauze 22 imparts tensile force to the metal mask 30 in its front-back and right-left directions, and the holding block members 10 impart tensile force to the respective corners in outwardly oblique directions.

Figure 2:
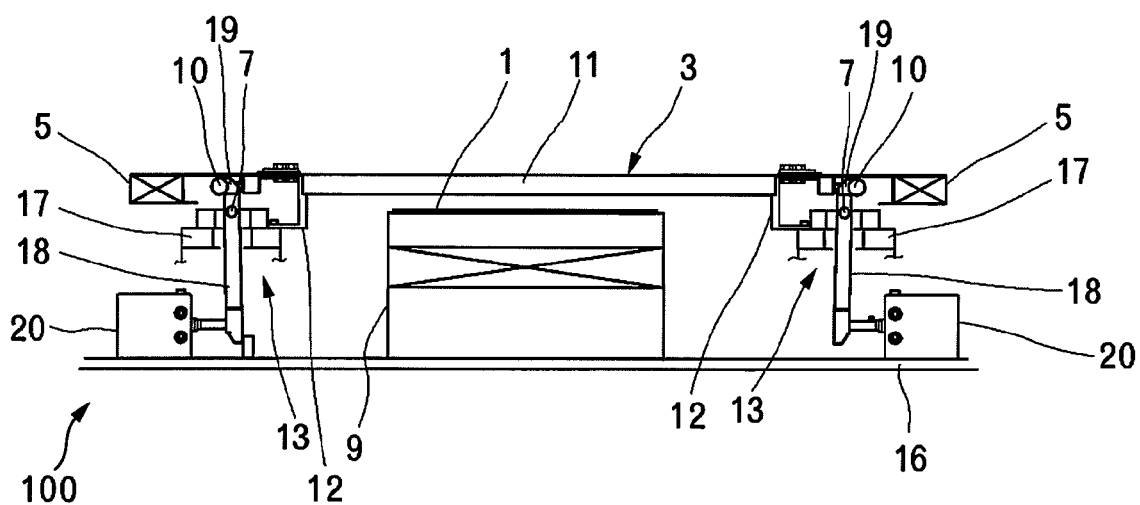
FIG. 2 is a schematic front view of a ball array mask supporting apparatus.

As shown in FIG. 2, the ball array mask 3 is supported by the ball array mask supporting apparatus 100 so as to situate at a position above the upper surface of the wafer 1 on which a surface for mounting the solder balls 2 is formed, with appropriate spacing therebetween. The ball array mask supporting apparatus 100 includes a backup plate 11 serving as a contact member of the present invention that is positioned so as to surround the wafer 1 placed on the wafer placement table 9; a backup plate support 12 that supports the backup plate 11 (see FIG. 2); and pulling mechanisms 13 that pull the respective holding block members 10 outside. Incidentally, in the embodiment, four pulling mechanism 13 pull the respective holding block members 10 attached to four corners of the metal mask 30 of the ball array mask 3 in a direction outward from a center of the ball array mask 3 (or center of the metal mask 30).

The backup plate 11 is made of plate-shaped stone having at a center thereof an opening 14 that is slightly larger than the wafer 1, as shown in FIG. 3. An upper surface of the backup late 11 is formed in a substantially flat surface having a high degree of plane accuracy. The backup plate 11 is positioned so as to surround the wafer 1 placed on the wafer placement table 9. Chamfered areas 11a are formed on respective four corners of the backup plate 11 corresponding to the respective positions of the holding block members 10 of the ball array mask 3 supported by the ball array mask supporting apparatus 100. In the embodiment, the backup plate 11 is formed into a single center-hollow plate shaped so as to surround the entire periphery of the wafer 1. However, the backup plate 11 does not need to assume a shape that surrounds the entirety of the wafer. Further, the backup plate 11 can also have a split structure rather than the structure of the single plate.

The backup plate 11 is supported by the backup plate supporting part 12 at a position where the upper surface of the backup plate becomes slightly higher than the surface of the wafer 1 on which the solder balls 2 are to be mounted. Since the backup plate 11 is made of stone rather than a metal material, high rigidity can be achieved, and influence of thermal deformation can also be diminished. The backup plate 11 made of stone can achieve a higher degree of plane accuracy than the metal material, and machining of the backup plate 11 can also be facilitated. Thus, manufacturing cost of the backup plate 11 can be reduced.

As shown in FIG. 2, a total of four pulling mechanisms 13 are provided, outside of the backup plate 11, in respective neighborhoods of the four corners of the ball array mask 3. Incidentally, one out of the four corners of the ball array mask 3 can be taken as a reference position and as a catch that has a holding part 19 for hooking and holding the holding block 10 formed on the ball array mask 3, and the other three corners of the ball array mask 3 can be taken as a pulling mechanism.

In each of the pulling mechanisms 13, an arm 18 is attached to an upper portion of a stand 17 fixed to a frame 16 where the backup plate supporting part 12 is provided, so as to be turnable around a fulcrum 7. An upper end of the arm 18 is formed as the holding part 19 that can be engaged with and disengaged from the holding block member 10. An air cylinder 20 joined to a lower portion of the arm 18 is actuated, whereby the holding part 19 can move outside of the backup plate 11 slightly downward. Accordingly, a position where the holding part 19 of the pulling mechanism 13 is engaged with the holding block member 10 is set so as to become substantially equal to or slightly lower than the position of the backup plate 11.

Procedures for attaching the ball array mask 3 to the ball array mask supporting apparatus 100 will now be described. First, the metal mask 30, the respective sides of which are imparted with tensile force by the gauze 22, is placed on the backup plate 11, to thus enable the holding block members 10 located at the respective corners of the metal mask 30 to engage with the holding parts 19 of the pulling mechanisms 13.

Subsequently, an air cylinder 20 of the pulling mechanism 13 serving as the reference position and an air cylinder 20 of the pulling mechanism 13 located at a position diagonal to the reference position are activated, thereby pulling the metal mask 30 in a diagonal direction. The holding part 19 of the pulling mechanism 13 moves at this time outside slightly downward, and thus the metal mask 30 is pressed against the backup plate 11 under tensile force.

Subsequently, the air cylinders 20 of the pulling mechanisms 13 positioned at the two remaining corners are activated, to thus apply tensile force to the ball array mask in a direction crossing the previous tensile direction, whereupon attachment of the ball array mask 3 is completed. According thereto, equal tensile force, which is stronger than that of the gauze 22, acts on the through-holed area 6 at the center of the metal mask 30 in directions of the four corners. The holding parts 19 of the pulling mechanisms 13 are pulled slightly downward from the upper surface of the backup plate 11 in this state. Therefore, the metal mask 30 is firmly affixed, under tensile force, to the backup plate 11 having a high degree of plane accuracy.

What is claimed is:

1. A ball array mask supporting apparatus that supports a ball array mask at a position above an object to be mounted, wherein the ball array mask comprises:
   a metal mask, which is formed in a substantially square shape, which comprises through holes into which minute balls are inserted, and which is positioned at a location above an object to be mounted;
   a hollow frame;
   a stretchable sheet, which affixes edges of the metal mask to the hollow frame, and which imparts tensile force to the metal mask in directions each of which is orthogonal to respective one of four sides of the metal mask; and
   projection members that are attached to the metal mask on substantially diagonal directions of respective corners of the metal mask, and
   wherein the ball array mask supporting apparatus comprises tensile force imparting units, which engage with the projection members that are provided to the metal mask being imparted the tensile force in directions orthogonal to respective four sides of the metal mask, and which pull the metal mask in a diagonal direction which is oriented slightly downward toward the object to be mounted and in externally oblique directions wherein the diagonal direction is diagonal relative to the four sides of the metal mask.

2. The ball array mask supporting apparatus according to claim 1 further comprising:
   a contact member that surrounds the object to be mounted; and
   tensile force imparting units that pull the ball array mask in a direction which is oriented slightly downward so as to press the ball array mask against the contact member and which pull the ball array mask outwardly.

* * * * *